United States Patent [19]

Smith, Jr.

[11] Patent Number: 4,502,419

[45] Date of Patent: Mar. 5, 1985

[54] DISCHARGE TUBE FOR INHIBITING STRATIFICATION IN FEEDWATER HEADERS OF A STEAM GENERATOR

[75] Inventor: Allen C. Smith, Jr., Bethel Park, Pa.

[73] Assignee: Westinghouse Electric Corp., Pittsburgh, Pa.

[21] Appl. No.: 609,679

[22] Filed: May 14, 1984

[51] Int. Cl.³ .......................... F22B 1/06; F22D 1/28
[52] U.S. Cl. .................................. 122/32; 122/438; 239/556
[58] Field of Search .................................. 122/32–34, 122/235 D, 360, 438; 239/556, 559

[56] References Cited

U.S. PATENT DOCUMENTS

| | | | |
|---|---|---|---|
| 2,609,236 | 9/1952 | Myshock | 239/559 |
| 3,142,306 | 7/1964 | Boka, Jr. | 239/559 |
| 3,635,287 | 1/1972 | Sprague | 122/32 |
| 3,912,460 | 10/1975 | McGann | 239/559 |
| 3,991,720 | 11/1976 | Byerley | 122/438 |
| 4,037,569 | 7/1977 | Bennett et al. | 122/32 |

Primary Examiner—Henry C. Yuen
Attorney, Agent, or Firm—F. J. Baehr, Jr.

[57] ABSTRACT

A nuclear steam generator having a feedwater ring disposed in the upper portion of the steam generator above the tubes, the feedwater header having a plurality of J-shaped discharge nozzles, some of which are in fluid communication with the upper portion of the feedwater ring header and others being in fluid communication with the lower portion of the feedwater ring header, those in fluid communication with the lower portion of the feedwater ring header having a discharge elevation lower than those in fluid communication with the upper portion of the feedwater header so that during low feedwater flow operation feedwater is fed from the lower portion of the feedwater header removing cold water therefrom and promoting mixing of the feedwater in the header in order to reduce stratification of feedwater therein.

12 Claims, 5 Drawing Figures

DISCHARGE TUBE FOR INHIBITING STRATIFICATION IN FEEDWATER HEADERS OF A STEAM GENERATOR

BACKGROUND OF THE INVENTION

This invention relates to steam generators for nuclear power plants and more particularly to such generators having feedwater inlet rings disposed in the upper portion thereof.

During the operation of steam generators with feedwater rings disposed in the upper portion and having discharge nozzles with a discharge level disposed above the feedwater header ring feedwater fills the pipes at all times. However, during low feed rates the feedwater tends to stratify in the header with the colder feedwater remaining in the lower portion of the header ring even when warmer feedwater is being introduced into the header ring at low flow rates.

U.S. Pat. No. 3,991,720 shows a feedwater header for a steam generator very similar to the one disclosed in this invention, however in this patent the J-shaped discharge nozzles all take their suction from the upper portion of the feedwater header.

SUMMARY OF THE INVENTION

In general, a steam generator utilizing a primary fluid to heat water to make steam, when made in accordance with this invention, comprises a shell portion, a plurality of tubes forming a tube bundle and disposed within the shell portion, a tubesheet having a plurality of holes disposed therein for receiving the ends of the tubes, a wrapper encircling the tube bundle and forming an annular space adjacent the shell, a feedwater header disposed within the shell so as to have an upper and lower portion, an inlet nozzle for supplying feedwater to the feedwater header, a first plurality of discharge nozzles disposed in fluid communication with the upper portion of the feedwater header and having a discharge level above the feedwater header and a second plurality of discharge nozzles in fluid communication with the lower portion of the header and having a discharge level which is above the upper portion of the feedwater header but lower than the discharge level of the first plurality of discharge nozzles whereby during periods of low feedwater flow cold feedwater is removed from the bottom of the header to stimulate mixing of the incoming feedwater with the feedwater in the header and an even temperature throughout the header.

BRIEF DESCRIPTION OF THE DRAWINGS

The objects and advantages of this invention will become more apparent from reading the following detail description in conjunction with the accompanying drawings, in which.

DESCRIPTION OF THE PREFERRED EMBODIMENT

Figure 1:
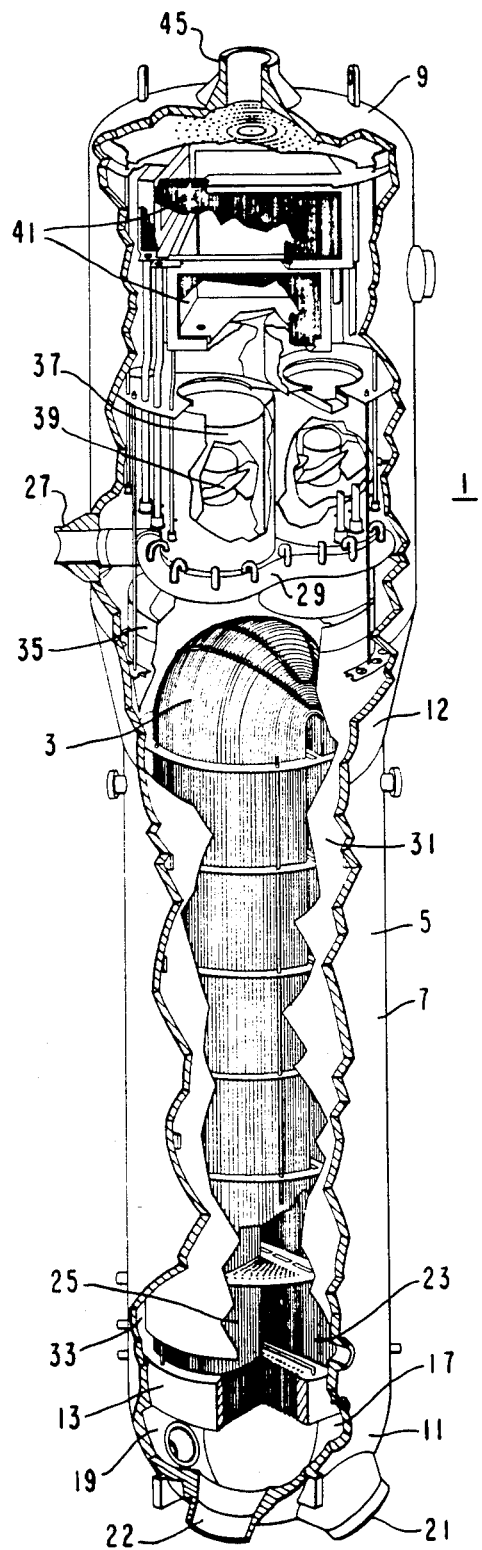
FIG. 1 is a perspective view of a steam generator made in accordance with this invention.

Referring now to the drawings in detail and in particular to FIG. 1 there is shown a steam generator 1 which utilizes U-shaped bundle of tubes to provide a heating surface required to transfer heat from a primary fluid to vaporize or boil a secondary fluid water. The steam generator 1 comprises a vessel 5 having a vertically oriented tubular shell portion 7 and an end closure or flanged and dished head 9 enclosing one end of the shell 7, the upper end, and a spherically shaped channel head 11 enclosing the other end of the shell, the lower end. The lower portion of the shell 7 is smaller in diameter than the upper portion and a frustoconically shaped transition member 12 connects the upper and lower portions. A tubesheet 13 is made integral with the channel head and shell and has a plurality of holes 14 disposed therein to receive ends of the U-shaped tubes 3. A dividing plate 15 is centrally disposed in the channel head 11 to divide the channel head into two compartments 17 and 19 which serve as headers for the tube 3. The compartment on the right as shown in FIG. 1 is a primary fluid inlet compartment 17 and has a primary fluid inlet nozzle 21 in fluid communication therewith. The compartment on the left, as shown in FIG. 1, is the primary fluid outlet compartment 19 and has a primary fluid outlet nozzle 22 disposed in fluid communication therewith thus causing the primary inlet fluid to flow through the tubes thereby creating a hot leg portion 23, the portion shown on the right in the drawings, and a cold leg portion 25, the portion shown on the left in the drawings. The secondary fluid or feedwater inlet nozzle 27 is disposed in the upper portion of the shell 7 above the tube bundle and has a feedwater ring header 29 disposed in fluid communication therewith.

The tube bundle 3 is encircled by a wrapper 31 which encloses the tube bundle and forms an annular chamber 33 between the wrapper 31 and the shell 7. The wrapper 31 has an upper cover or head 35 disposed above the bends of the U-shaped tubes 3. The head 35 has a plurality of openings in communication with tubes 37 which have swirl vanes 35 disposed therein to cause steam flowing therethrough to spin and centrifugally remove some of the moisture contained therein as it flows through the tubes 37. After flowing through the centrifugal separator tubes 37 the steam then passes through chevron-type separators 41 before reaching a secondary fluid outlet nozzle 45 centrally disposed in the flanged and dished head 9.

Figure 2:
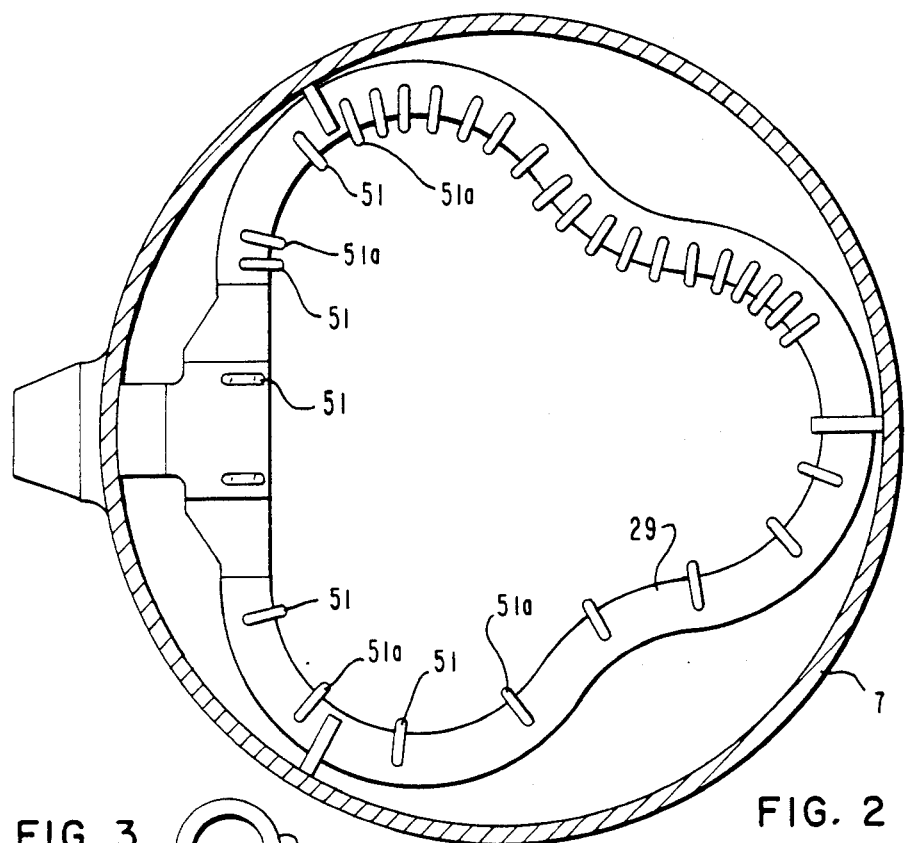
FIG. 2 is a plan view of a feedwater ring header made in accordance with this invention.

The feedwater ring header 29 encircles the centrifugal separator tubes 37 and, as shown in FIG. 2, comprises a plurality of loops, 3 as shown, forming a generally cloverleaf-shaped continuous ring. The feedwater inlet nozzle 27 joins the feedwater ring header 29 and forms a T therewith. The feedwater ring header 29 has a plurality of J-shaped nozzles 51 which are asymmetrically disposed in fluid communication therewith with a greater number of the discharge nozzles 51 being disposed on the hot leg portion of the feedwater ring header to enhance the thermal condition within the steam generator by providing a discharge of about 80% of the feedwater flow down the hot leg side of the annular chamber 33. While the asymmetrical arrangement is preferred symmetrical disposition of the J-shaped discharge nozzles is considered to be within the scope of this invention.

Figure 3:
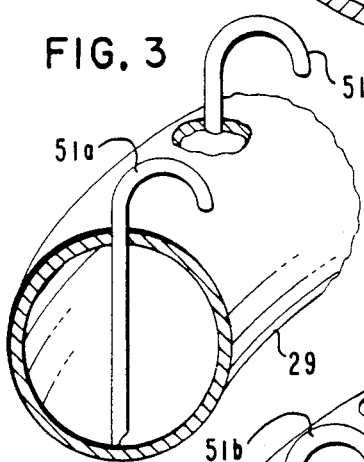
FIG. 3 is a sectional view taken on line III—III of FIG. 2.

The nozzles 51 are generally in fluid communication with the upper portion of the feedwater ring header 29 as shown in FIG. 3 while the J-shaped nozzles 51a have a long stem which extends through the upper portion of the ring header and downwardly to the bottom inner portion of the ring header so that the J-shaped nozzles 51a take feedwater from the bottom portion of the feedwater header 29 while the J-shaped nozzles 51 take feedwater from the top portion of the feedwater header 29. The bottom or distal end of the stems of the J-shaped nozzles 51a are cut off at an angle to allow feedwater to enter therein. It should also be noted that the J-shaped nozzle 51a has a reverse bend and it is located at a slightly lower elevation than the reverse bend of the J-shaped nozzle 51 so that at low feedwater rates the feedwater nozzle 51a would handle the feedwater being fed to the steam generator rather than the nozzles 51. Thus the feedwater would come from the bottom portion of the feedwater header 29 during low feedwater flow to stimulate mixing of the influent feedwater with that already in the header to more evenly distribute the warmer influent feedwater and mix it with the water stored in the feedwater header to provide an even temperature throughout the feedwater header.

Figure 4:
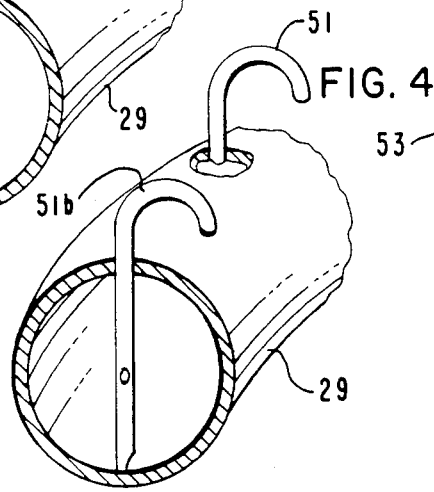
FIG. 4 is a sectional view taken on line IV—IV of FIG. 2.

FIG. 4 shows a J-shaped nozzle 51b which also has a long stem which extends through the upper wall of the feedwater ring header 29 and downwardly to the lower portion of the inside of the feedwater header 29 and has one or more ports disposed along the stem adjacent the central portion of the feedwater header 29 to promote intake from various elevations within the header. The J-shaped nozzle 51b has a reverse bend disposed at a lower elevation than the J-shaped nozzle 51.

Figure 5:
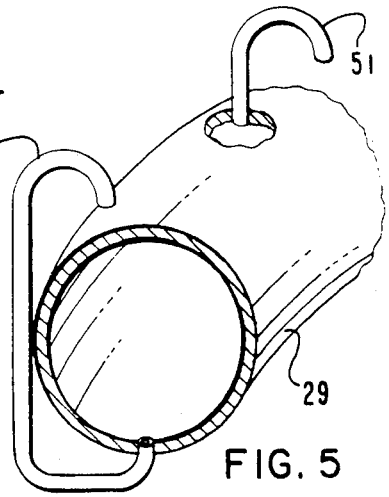
FIG. 5 is a partial sectional view of a feedwater ring header with alternative discharge nozzles.

FIG. 5 shows a C-shaped discharge nozzle 53 in fluid communication with the bottom or lower portion of the feedwater header ring 29. The C-shaped nozzle 53 has two reverse bends, one on the top and one on the bottom. The bottom reverse bend is in fluid communication with the bottom of the feedwater ring header 29 while the upper reverse bend or discharge end is disposed at an elevation slightly lower than that of the discharge nozzles 51.

One or more of the J-shaped discharge nozzles 51a or 51b or the C-shaped nozzles 53 may be alternately disposed around the feedwater ring header 29 with the J-shaped discharge nozzles 51 or vice versa.

The J and C-shaped nozzles hereinbefore described advantageously inhibit stratification of the feedwater within the feedwater ring header 29 while still preventing vapor entrapment, and since some of the J-shaped nozzles 51a or 51b or C-shaped nozzles 53 draw feedwater from the lower cool portion of the feedwater header ring 29 and their spillover or discharge elevation is at a lower elevation than the J-shaped nozzles 51, the colder feedwater is discharged from the feedwater header particularly at low feedwater feed rates, thus reducing the inventory of cold feedwater in the feedwater ring header 29 and promoting mixing of the feedwater in the feedwater header 29 to promote more uniform feedwater header temperature distribution.

What is claimed is:

1. A steam generator utilizing a primary fluid to boil water to make steam, said steam generator comprising:

a shell portion;
    a plurality of tubes forming a tube bundle and disposed within said shell portion;
    a tubesheet having a plurality of holes disposed therein for receiving the ends of the tubes;
    a wrapper encircling said tube bundle and forming an annular space adjacent said shell;
    a feedwater header disposed within said shell so as to have an upper and lower portion;
    an inlet feedwater nozzle for supplying feedwater to said feedwater header;
    a first plurality of discharge nozzles disposed in fluid communication with the upper portion of said feedwater header and having a discharge level above said feedwater header;
    a second plurality of discharge nozzles in fluid communication with the lower portion of the feedwater header and having a discharge level which is above the upper portion of the feedwater header, but lower than the discharge level of the first plurality of discharge nozzles;
    whereby during periods of low feedwater flow cold feedwater is removed from the bottom of the feedwater header to stimulate mixing of feedwater with the feedwater in the head and an even temperature throughout the header.

2. A steam generator as set forth in claim 1, wherein the second plurality of discharge nozzles extend through the upper portion of the feedwater header and are open adjacent the lower portion of the feedwater header.

3. A steam generator as set forth in claim 2, wherein the second plurality of discharge nozzles have ports adjacent the central portion of the feedwater header.

4. A steam generator as set forth in claim 1, wherein the reverse bends are so oriented that the discharge nozzles discharge inwardly with respect to the ring formed by the feedwater header.

5. A steam generator as set forth in claim 1, wherein the feedwater header is a continuous ring.

6. A steam generator as set forth in claim 5, wherein the discharge nozzles include a reverse bend adjacent their discharge end.

7. A steam generator as set forth in claim 6 wherein the second plurality of discharge nozzles extend through the upper portion of the feedwater header and are open adjacent the lower portion of the feedwater header.

8. A steam generator as set forth in claim 7 wherein at least one of the second plurality of discharge nozzles is disposed between adjacent discharge nozzles from the first plurality of discharge nozzles.

9. A steam generator as set forth in claim 8, wherein the discharge nozzles are asymmetrically disposed.

10. A steam generator as set forth in claim 7, wherein more than one nozzle of the second plurality of discharge nozzles are disposed between adjacent discharge nozzles from the first plurality of discharge nozzles.

11. A steam generator as set forth in claim 10, wherein the discharge nozzles are asymmetrically disposed.

12. A steam generator as set forth in claim 7, wherein the discharge nozzles are asymmetrically disposed.

* * * * *